United States Patent [19]

Frazier

[11] Patent Number: 5,176,308
[45] Date of Patent: Jan. 5, 1993

[54] CLOSURE FOR GABLE TOP CONAINER
[75] Inventor: Stephen L. Frazier, Midlothian, Va.
[73] Assignee: Westvaco Corporation, New York, N.Y.
[21] Appl. No.: 897,838
[22] Filed: Jun. 12, 1992
[51] Int. Cl.5 .............................................. B65D 5/08
[52] U.S. Cl. ................. 229/137; 229/125.42; 229/249
[58] Field of Search ............... 229/214, 249, 125.42, 229/132, 137, 138

[56] References Cited

U.S. PATENT DOCUMENTS 3,189,246 6/1965 Seline. Jr. .
3,245,603 4/1966 Wilcox ................................ 229/214
3,334,799 8/1967 Crawford .
3,471,076 10/1969 Crawford .
4,762,234 8/1988 Wyberg .............................. 229/249
4,802,620 2/1989 Phillips .............................. 229/137
4,946,041 8/1990 Poole ................................. 229/249

Primary Examiner—Allan N. Shoap
Assistant Examiner—Christopher J. McDonald

[57] ABSTRACT

The top seal of a gable top container prepared from sheet material is improved by leaving tufts of sheet material attached at staggered intervals along the upper edges of the inner rib panels. When the top of the container is sealed, the gap normally found in the area above the inner rib panels and the sealing flaps is closed when the tufts become aligned.

9 Claims, 2 Drawing Sheets

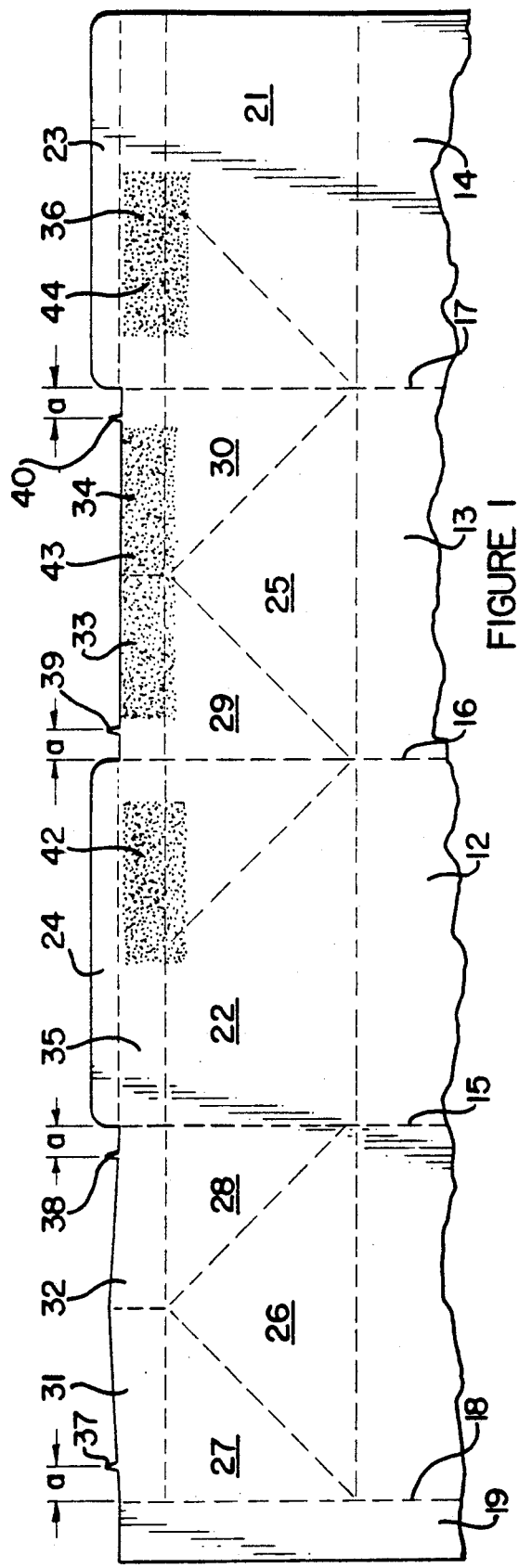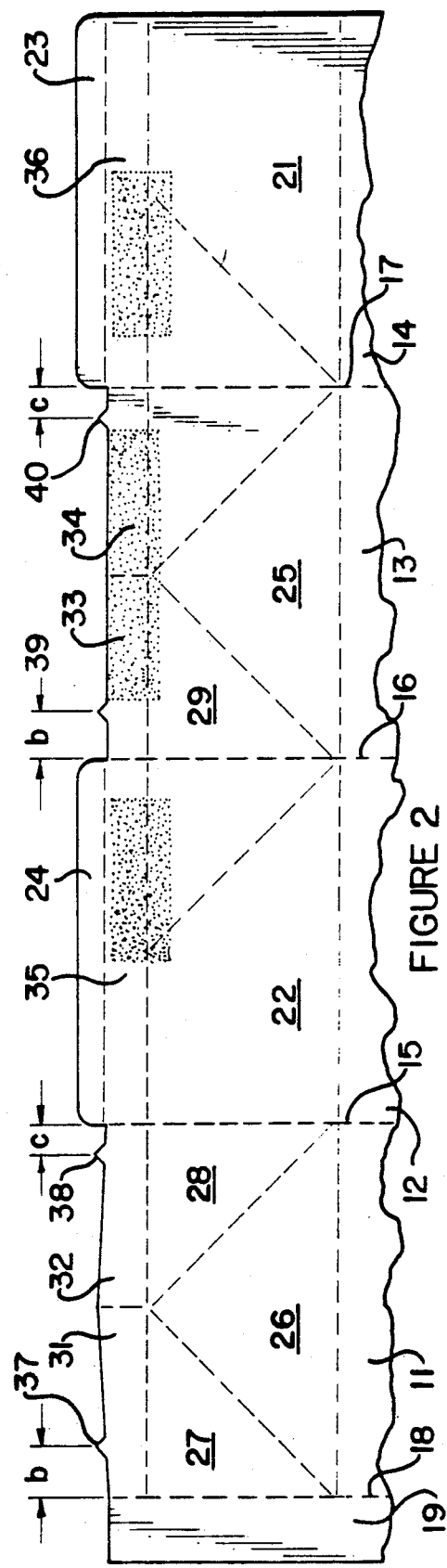

CLOSURE FOR GABLE TOP CONAINER

BACKGROUND OF THE INVENTION

The present invention relates to gable top containers, and more particularly to the top closure seal of a gable top container prepared from a blank of sheet material, as for example, paperboard. The invention finds utility in the manufacture of gable top containers for use in packaging fluids, for example, milk, juices, syrups and other liquid products. An object of the present invention is to eliminate so called "top leakers".

Gable top containers are presently in use for a number of liquid applications. Their style is well known to most users from school children to adults. Such containers are generally prepared from paperboard having their overall inner and outer surfaces coated with a thermoplastic coating, i.e., low density polyethylene (LDPE), which allows the containers to be side seamed under heat and pressure for shipping, and ultimately bottom formed and top closed with the aid of heat and pressure when the containers are formed and filled. Depending upon the products packaged in such containers, the paperboard structure may include other polymer layers to provide barriers to the ingress or egress of oxygen, flavors, or odors. In any event, such containers start out in the form of blanks of the paperboard laminate which are cut into shape and impressed with an appropriate pattern of score lines to define the side panels, bottom closure flaps and top closure flaps. More often than not, the integrity of the seals made to form the carton are just as important as the actual laminate construction, particularly where a long shelf life is desired. The increased amount of material used in making large size containers makes the control of the folding and sealing operations even more critical because of the increased possibility of creating fluid escape channels where multiple thicknesses of sheet material are sealed together.

U.S. Pat. Nos. 3,334,799 and 3,471,076 each show a means for closing the channel that is formed in the region of the top seal of a gable top container. The means shown in these patents involves the addition of tufts to the upper edges of the inner rib panels wherein when the carton is formed, the tufts lie opposite one another at one or more spaced locations along the edges of the panels. Thus when the containers employing the designs of the '076 and '079 patents are sealed, the tufts are pressed together to hopefully block the channel. Unfortunately the mass and integrity of the generally small tufts used in the past are often compromised during blank production and during the subsequent filling and top closing operation. In addition, with the tufts placed opposite one another they can create an inconsistent seal for the top closure flaps of the container, thus becoming actually counterproductive. A related structure is also shown in U.S. Pat. No. 3,189,246, wherein two tabs are opposed in the top closure of a gable top container, but it suffers from the same defects of the aforementioned patents.

It is therefore an object of the present invention to provide a new and improved gable top closure with effectively sealed fluid escape channels.

Another object of the present invention is to provide a container of the general type disclosed which has an extensible pouring spout which can easily be released and extended by the consumer.

These and other objects will become more apparent by reference to the drawings and the detailed description.

SUMMARY OF INVENTION

The present invention relates to a gable top container with an improved top seal construction wherein the gap or channel normally found in the area above the inner rib panels and the sealing flaps is effectively sealed against unwanted leakage. The object of the present invention is achieved by providing tufts along the upper edges of the inner rib panels of a standard gable top container blank in selected locations so that the tufts end up in a staggered relationship with respect to one another when the top sealing flaps are heat sealed together. By arranging the tufts in a staggered relationship they do not interfere with one another when the top is sealed, they can be made larger than the conventional tufts employed by the prior art so as to protect their integrity during production, and in their staggered relationship, they provide an extended blockage for the gap or channel rather than a single stop as provided by the prior art. The result is an improved and more uniform top seal with enhanced utility, especially for products having a long shelf life.

DESCRIPTION OF DRAWING

FIG. 1 is a partial plan view of a typical gable top container showing the locations of tufts used by the prior art;

FIG. 2 is a partial plan view of a typical gable top container of the present invention showing an example of how the tufts can be relocated to achieve a staggered relationship;

DETAILED DESCRIPTION

Figure 3:
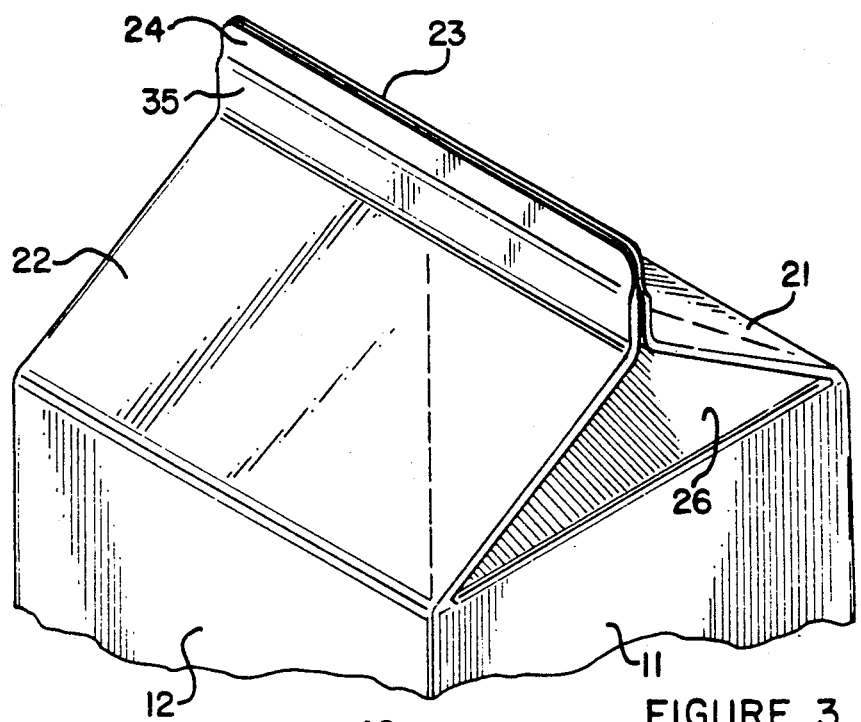
FIG. 3 is a perspective view of a typical gable top container employing the staggered tufts of the present invention; and, FIG. 4 is a top perspective view of the gable top container of FIG. 3 with one of the roof panels removed.

A typical container of the type in which the present invention is used is shown in the accompanying drawings. Such containers are illustrated in considerable detail in any one of a number of prior art patents, particularly those assigned to EX-Cell-0 Corporation. However, for purposes of the present invention it is sufficient to note that such containers may be formed from a foldable sheet material, e.g., paperboard or the like, and that they are self-sustaining in shape. The sheet material is rendered liquid impervious and heat sealable with the use of a coating on both surfaces of a thermoplastic material, e.g., polyethylene, making the container useful for holding any number of different liquid materials. Where appropriate the laminate so formed may include additional barrier coatings to prevent the egress or ingress of odors, oxygen or other permeable materials. The thermoplastic outer and inner coatings serve as a heat sealable means for side seaming the containers and for forming the top and bottom closures in the conventional manner.

Referring now to FIG. 1, there is shown only the top portion of a blank for a typical gable top container currently found in use. The bottom structure would be the same as shown in the prior art. The blank is divided into a plurality of side panels 11, 12, 13 and 14 by vertical fold lines 15, 16 and 17 which form the body of the container 20, and a fifth panel or side seam flap 19 attached to panel 11 along a score line 18. The gable top closure is formed by the roof panels 21, 22, which include upper sealing flaps 23, 24 together with a pair of triangular end panels 25, 26 joined to the adjacent roof panels 21, 22 by the triangular fold back panels 27, 28 and 29, 30. To complete the rib portion, each of the triangular fold back panels 27, 28 and 29, 30 includes adjacent their upper edges corresponding inner rib panels 31, 32 and 33, 34. Likewise, the roof panels 21, 22 are provided with outer rib panels 35, 36. The prior art blank shown in FIG. 1 includes a plurality of tufts 37, 38, 39, 40, each equidistantly spaced from the score lines 18, 15, 16 and 17 by a distance "a". These tufts are designed to close the gap normally formed in the gable top when it is formed by abutting one another when the carton top is sealed.

FIG. 2 shows a blank structure according to the present invention wherein like panels corresponding to those shown in FIG. 1 are applied with common reference numerals. The differences between the prior art blank shown in FIG. 1 and the invention blank of FIG. 2 are the location of the tufts 37, 38, 39 and 40 with respect to the fold lines 18, 15, 16 and 17, and the size of the tufts. For example, the tufts 37 and 38 which would abut one another in a container formed from the blank of FIG. 1 are offset from the score lines 18 and 17 by different distances "b" and "c" so that they become staggered with respect to one another and become aligned in a container formed from the blank of FIG. 2. Likewise the tufts 39 and 40 of FIG. 2 are offset from the score lines 15 and 16 by the distances "b" and "c" to achieve the same purpose. This offset relationship of the tufts allows the manufacturer to make the tufts shown in FIG. 2 larger than those of the prior art. The larger tufts of the present invention obviously fill the gap better than the smaller tufts of the prior art but the larger size also provides the tufts with greater integrity which isn't compromised during production and subsequent filling and sealing operations.

In a completed top closure as shown in FIG. 3, the rib panels are all laminated together with the inner rib panels 31, 32 and 33, 34 folded between the outer rib panels 35 and 36. To seal the closure, heat is applied to the thermoplastic coating on the various rib panels and the sealing flaps 23, 24 just before the container is closed, after which a sealing pressure is applied to the sealing flaps 23, 24 and the outer ribs 35, 36 so that the heated thermoplastic material fuses to form a liquid tight sanitary seal. When this occurs, a gap or channel 41 is formed in the space between the sealed upper flaps 23 24 and the inner ribs comprising 31, 32 at one side and 33, 34 at the other side all sandwiched between ribs 35, 36. In fact, an adhesive 42, 43, 44 is applied between the rib panels 33, 34 and 35, 36 at one side of the top closure so that the seal can be released to pull out the pour spout panels 25, 29 and 30 for dispensing. Nevertheless, prior to dispensing the product, it is desirable to keep liquid out of the channel 41 which could produce a so-called "leaker".

Figure 4:
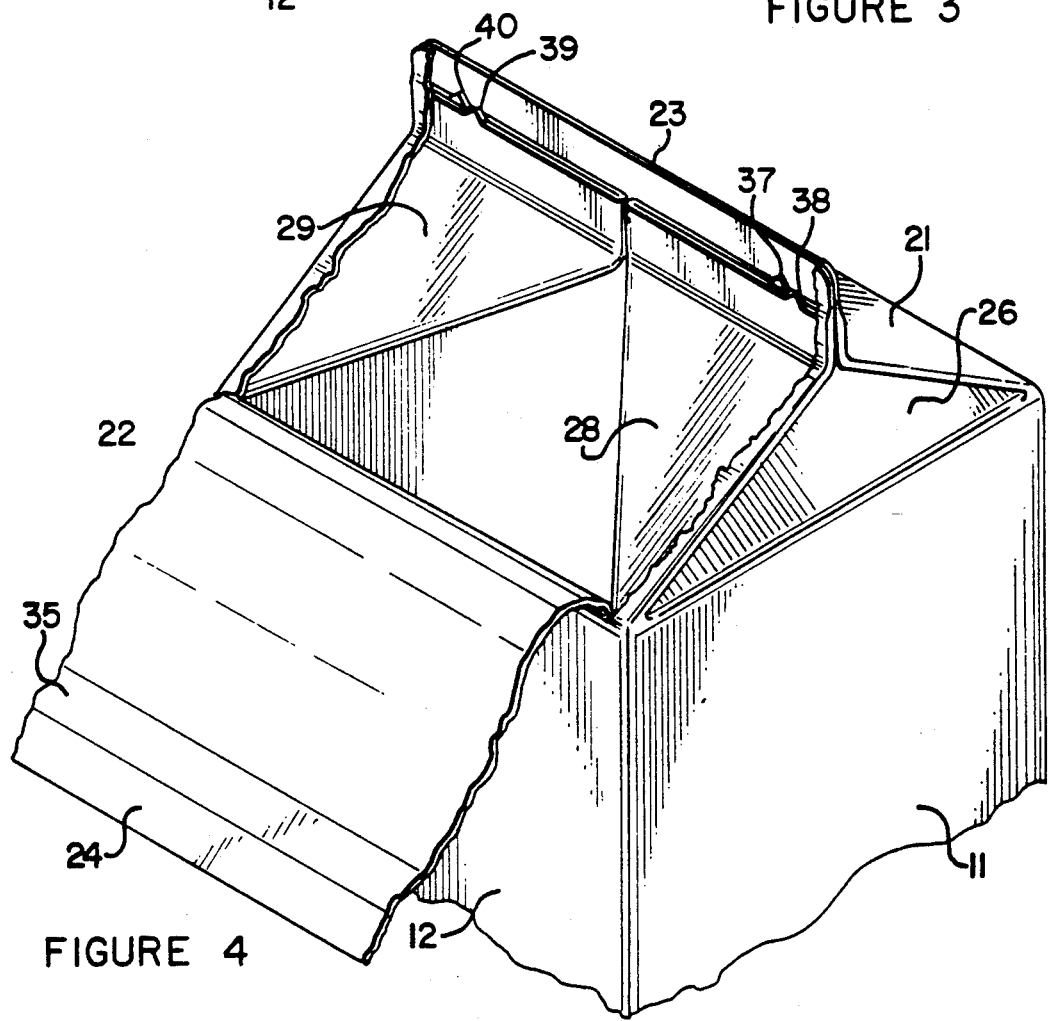

This result is accomplished with the present invention by the strategic placement of staggered tufts 37, 38, 39 and 40 along the upper edges of rib panels 31, 32, 33 and 34 particularly as shown in FIG. 4. Thus when the sealing flaps 23, 24 are adhered together, they engage the tufts 37-40 and squeeze them into alignment effectively blocking the channel 41. The tufts 37-40 are formed as integral extensions of the sheet material used for the blank. The height of the tufts above the upper edges of the rib panels is on the order of from about 1-2 mm and the length at the base of the tufts is on the order of about 4 mm. This contrasts with the size of the tufts presently in use which are about 1-2 mm by 1-2 mm (height to base).

Accordingly, there is described herein a preferred embodiment of the present invention. It will be understood, however, that the invention may be susceptible to modification, variation or changes without departing from the spirit and scope of the invention as defined in the appended claims. For example, the tufts particularly as disclosed herein may be employed across the entire top edges of the rib panels in staggered relation depending upon the size of the containers involved. Moreover, while the two distances "b" and "b" are shown as substantially equal, these distances and likewise the distances "c" and "c" could all be different. In addition, the size and shape of the tufts may be altered or changed to accommodate different size containers and sheet material having different thickness. Finally the tufts may be used at other locations on the blank structure to block other channels.

What is claimed is:

1. In a gable top container formed from sheet material having its inner and outer surfaces coated with a thermoplastic heat sealable coating comprising:
    (a) a generally rectangular tubular body formed by score lines in said sheet material and having top and bottom closure flaps foldably attached thereto;
    (b) inner and outer rib panels foldably attached to the top closure flaps and adapted to be sealed together to form a liquid tight seal; and,
    (c) a pair of top sealing flaps foldably attached to a first opposed pair of outer rib panels for completing the top closure, the improvement for blocking the channel which occurs between the inner rib panels and the top sealing flaps when the container top is heat sealed comprising, a plurality of tufts of sheet material extending from the upper edges of the inner rib panels, said tufts being positioned at predetermined distances from the score lines for said tubular body so that the tufts become aligned in a staggered relationship within the channel between the inner rib panels and the top sealing flaps when the top closure is sealed.

2. The gable top container of claim 1 wherein the tufts are arranged to lie in adjacent pairs at each side of the container.

3. The gable top container of claim 1 wherein the tufts are arranged to lie throughout the entire length of the inner rib panels from side-to-side of the container.

4. The gable top container of claim 2 wherein the tufts are on the order of from about 1-2 mm in height above the rib panels and about 4 mm in base length along the rib panel.

5. The gable top container of claim 4 wherein the tufts are in the shape of triangles with their bases formed along the upper edges of the rib panels.

6. A liquid proof, gable top, paperboard container coated on the outside and inside with a thermoplastic material that serves as a barrier and an adhesive when subjected to heat, and including a tubular body of generally rectangular cross section formed by corner fold lines having one side panel thereof overlapping a side seam flap of another side panel and a bottom closure thereon, a pair of opposed roof panels extended toward one another and overlying said tubular body, a pair of opposed triangular end panels infolded between said roof panels from opposite gable ends, two pairs of triangular fold back panels, each pair being integral with a respective one of said infolded triangular end panels, said fold back panels being folded along fold lines formed at the lateral ends of respective roof panels, an outer rib panel attached to each roof panel, a pair of inner rib panels joined by a fold line and attached to each pair of triangular fold back panels and adjoining end panel, and a sealing flap integral with each one of said outer rib panels, each of said sealing flaps having a marginal sealing area defined thereon, said rib panels and said marginal sealing areas being sealed together to form a top closure rib, the improvement for blocking the channel that normally occurs between the top of the inner rib panels and the sealing flap when the top closure is sealed comprising a plurality of tufts of container material integral with the upper edges of said inner rib panels said tufts being spaced non-equidistantly from the corner fold lines of said tubular body so that said tufts become aligned with one another to fill the said channel when the top closure is sealed.

7. A one piece, foldable blank of sheet material for forming a container of rectangular cross section and having a gable top, said blank including laterally spaced apart vertical score lines which define opposed front and rear side wall panels and first and second end wall panels and a side seam panel, bottom closure flaps foldably attached to the lower edges of said body panels along a score line extending transversely of said blank and top closure flaps foldably attached to the upper edges of said body panels along a score line extending transversely of said blank, said top closure flaps being divided into roof panels, triangular fold back panels, rib panels and sealing flaps, the improvement comprising a plurality of tufts of sheet material integral with the upper edges of selected rib panels of said blank said tufts of sheet material being located non-equidistantly from the vertical score lines in said blank.

8. The blank structure of claim 7 wherein said tufts have dimensions on the order of from 1-2 mm in height above the upper edges of said rib panels with a base length of about 4 mm in length along said rib panels.

9. The blank structure of claim 8 wherein both the inner and outer surfaces of said sheet material is coated with a thermoplastic coating to provide a barrier layer and an adhesive when exposed to heat.

* * * * *